US012587012B2

(12) United States Patent (10) Patent No.: US 12,587,012 B2
Mills-Price et al. (45) Date of Patent: Mar. 24, 2026

(54) COMPACT ENERGY SYSTEM FOR MANAGING MOBILE POWER

(71) Applicant: RV Mobile Power, LLC, Columbus, OH (US)

(72) Inventors: Michael Mills-Price, Bend, OR (US); Tyler Dunham, Dublin, OH (US)

(73) Assignee: RV MOBILE POWER, LLC, Columbus, OH (US)

( * ) Notice: Subject to any disclaimer, the term of this patent is extended or adjusted under 35 U.S.C. 154(b) by 0 days.

(21) Appl. No.: 18/329,860

(22) Filed: Jun. 6, 2023

(65) Prior Publication Data

US 2023/0396062 A1 Dec. 7, 2023

Related U.S. Application Data

(60) Provisional application No. 63/349,328, filed on Jun. 6, 2022.

(51) Int. Cl.
| | |
|---|---|
| *H02J 1/10* | (2026.01) |
| *H02J 3/32* | (2026.01) |
| *H02J 3/38* | (2026.01) |
| *H02J 7/35* | (2006.01) |
| *H02J 7/61* | (2026.01) |
| *G01K 7/04* | (2006.01) |
| *H01M 10/48* | (2006.01) |

(52) U.S. Cl.
CPC ................. *H02J 1/10* (2013.01); *H02J 3/32* (2013.01); *H02J 3/381* (2013.01); *H02J 7/35*

(2013.01); *H02J 7/61* (2026.01); *G01K 7/04* (2013.01); *H01M 10/486* (2013.01)

(58) Field of Classification Search
CPC ...... H02J 1/10; H02J 3/32; H02J 3/381; H02J 7/35; H02J 9/00; B60H 1/00364; B60L 1/00; B60L 53/53; B60L 53/51
See application file for complete search history.

(56) References Cited

U.S. PATENT DOCUMENTS

| | | | | |
|---|---|---|---|---|
| 2003/0091901 A1* | 5/2003 | Kaneda | ................. | H01M 4/583 |
| | | | | 429/231.95 |
| 2004/0199297 A1* | 10/2004 | Schaper | ................ | H02J 7/0049 |
| | | | | 700/287 |
| 2008/0100140 A1* | 5/2008 | Sorenson | .......... | H02J 13/00016 |
| | | | | 307/40 |
| 2008/0164850 A1* | 7/2008 | Ayana | ....................... | H02J 9/00 |
| | | | | 322/1 |

(Continued)

*Primary Examiner* — Rexford N Barnie
*Assistant Examiner* — Rasem Mourad
(74) *Attorney, Agent, or Firm* — Suiter Swantz IP

(57) ABSTRACT

Exemplary embodiments of a recreational vehicle power system are shown and described herein, the system having a transfer switch in AC power connection with an AC power bus and adapted to accept shore power input and generator power input as well as a DC-DC converter in DC power connection with a DC power bus. Additionally, embodiments include a solar charge controller, a bi-directional inverter in AC power connection with the transfer switch, a battery management assembly, and a battery. Preferably, a control module is placed in DC power connection with the DC power bus and in electrical communication with the battery management assembly, solar charge controller, and bi-directional inverter.

14 Claims, 8 Drawing Sheets

(56) References Cited

U.S. PATENT DOCUMENTS

| | | | |
|---|---|---|---|
| 2010/0109437 A1* | 5/2010 | Fattic | B60L 58/21 |
| | | | 903/903 |
| 2011/0076875 A1* | 3/2011 | Fleisig | H01R 13/72 |
| | | | 307/66 |
| 2014/0214242 A1* | 7/2014 | Seo | B60L 58/20 |
| | | | 701/2 |
| 2015/0357840 A1* | 12/2015 | Okada | H02J 7/35 |
| | | | 320/128 |
| 2015/0360568 A1* | 12/2015 | Champagne | B60L 1/003 |
| | | | 296/156 |
| 2017/0324145 A1* | 11/2017 | Janscha | G01F 23/38 |
| 2019/0047432 A1* | 2/2019 | Clark | B60L 53/60 |
| 2021/0273447 A1* | 9/2021 | Thomas | H02H 9/04 |
| 2022/0379734 A1* | 12/2022 | Kim | H02S 20/30 |
| 2022/0393262 A1* | 12/2022 | Rosenberger | H01M 10/6556 |
| 2023/0139514 A1* | 5/2023 | Tennant | H02J 3/003 |
| | | | 700/291 |

* cited by examiner

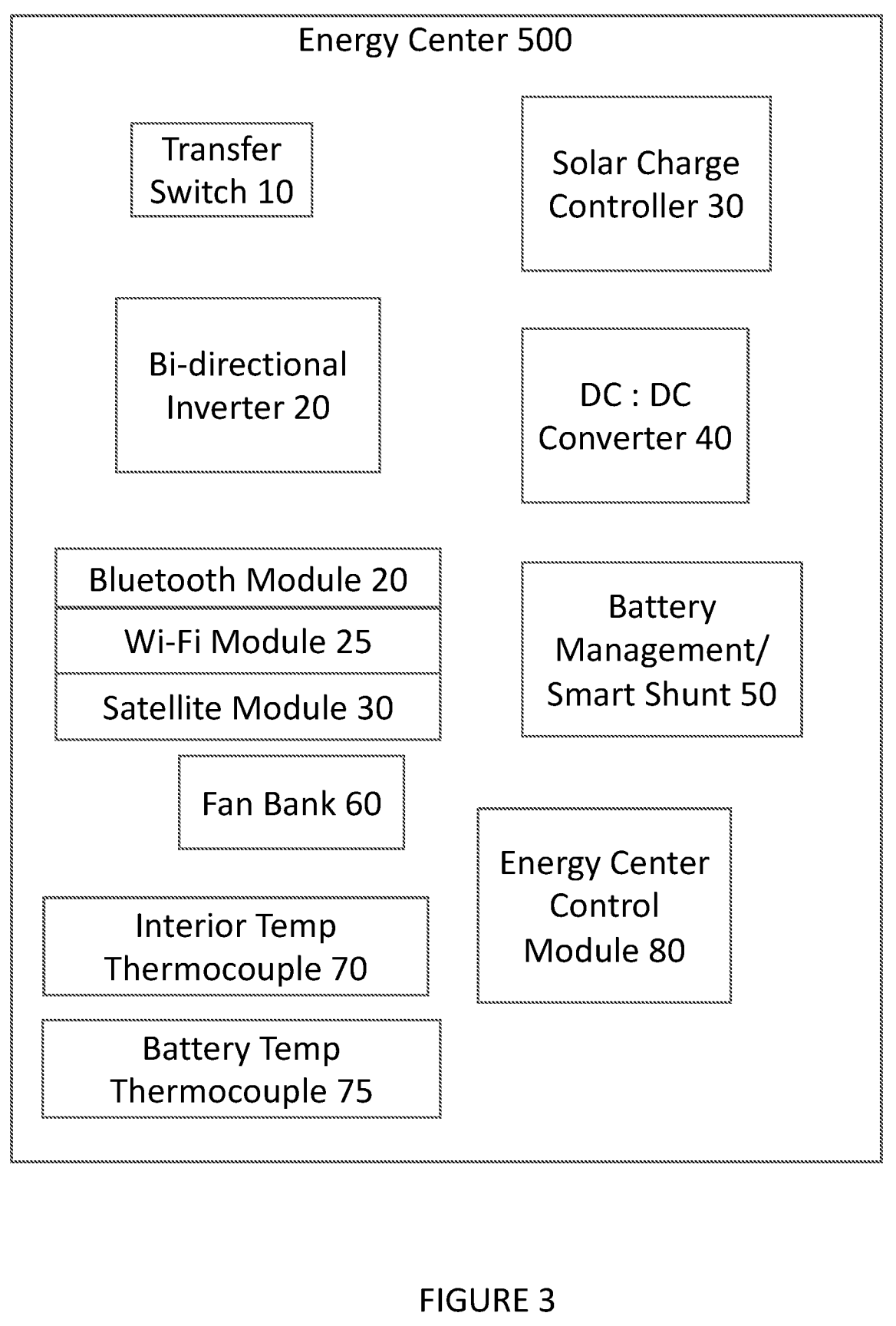

Energy Center 500

Transfer Switch 10

Solar Charge Controller 30

Bi-directional Inverter 20

DC : DC Converter 40

Bluetooth Module 20

Wi-Fi Module 25

Satellite Module 30

Battery Management/ Smart Shunt 50

Fan Bank 60

Energy Center Control Module 80

Interior Temp Thermocouple 70

Battery Temp Thermocouple 75

FIGURE 3

COMPACT ENERGY SYSTEM FOR MANAGING MOBILE POWER

CROSS-REFERENCE TO RELATED APPLICATIONS

This application claims priority to U.S. Provisional Application No. 63/349,328 filed on Jun. 6, 2022 which is herein incorporated by reference in its entirety.

TECHNICAL FIELD

Embodiments generally relate to compact electrical assemblies for managing multiple power sources.

BACKGROUND OF THE ART

Recreational Vehicles such as campers, trailers, motor coaches, buses, and camper vans (herein 'RVs') have traditionally been powered with a gas-powered generator and a separate 12V lead acid battery. It is now desirable to incorporate shore power and solar power as inputs for an RV power system as well as provide a number of safety and performance features.

The installation of existing RV power systems is costly, both from a labor and a unit cost standpoint. As the complexity of the electrical systems increase, it is desirable to have a simpler and smaller unit that is easier and safer to install by both original equipment manufacturers as well as at-home do it yourself enthusiasts. It is further desirable to increase the safety and efficiency of existing RV power systems, and the discoveries outlined herein provide these surprising benefits.

SUMMARY OF THE EXEMPLARY EMBODIMENTS

Exemplary embodiments provide an electrical energy center assembly for distributing various power inputs to a variety of different electrical loads (ex. appliances) within an RV while balancing the needs of a battery bank and solar array. AC and DC power are accepted and distributed while communications with a control module allow the user to view, manage, and make changes to the power settings. A generator is in electrical communication with the control module so that when the battery bank has reached a lower threshold limit it can be automatically charged using an electrical start signal sent from the control module to the generator. Similarly, when the battery bank has reached an upper threshold limit the control module may send an automatic stop signal to the generator. A thermocouple may be positioned to determine the battery temperature and charging or dis-charging can be slowed or stopped when high temperatures are measured.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which:

FIG. 3 is a simplified electrical block diagram of the internal components of an embodiment of the energy center.

DETAILED DESCRIPTION

Figure 1:
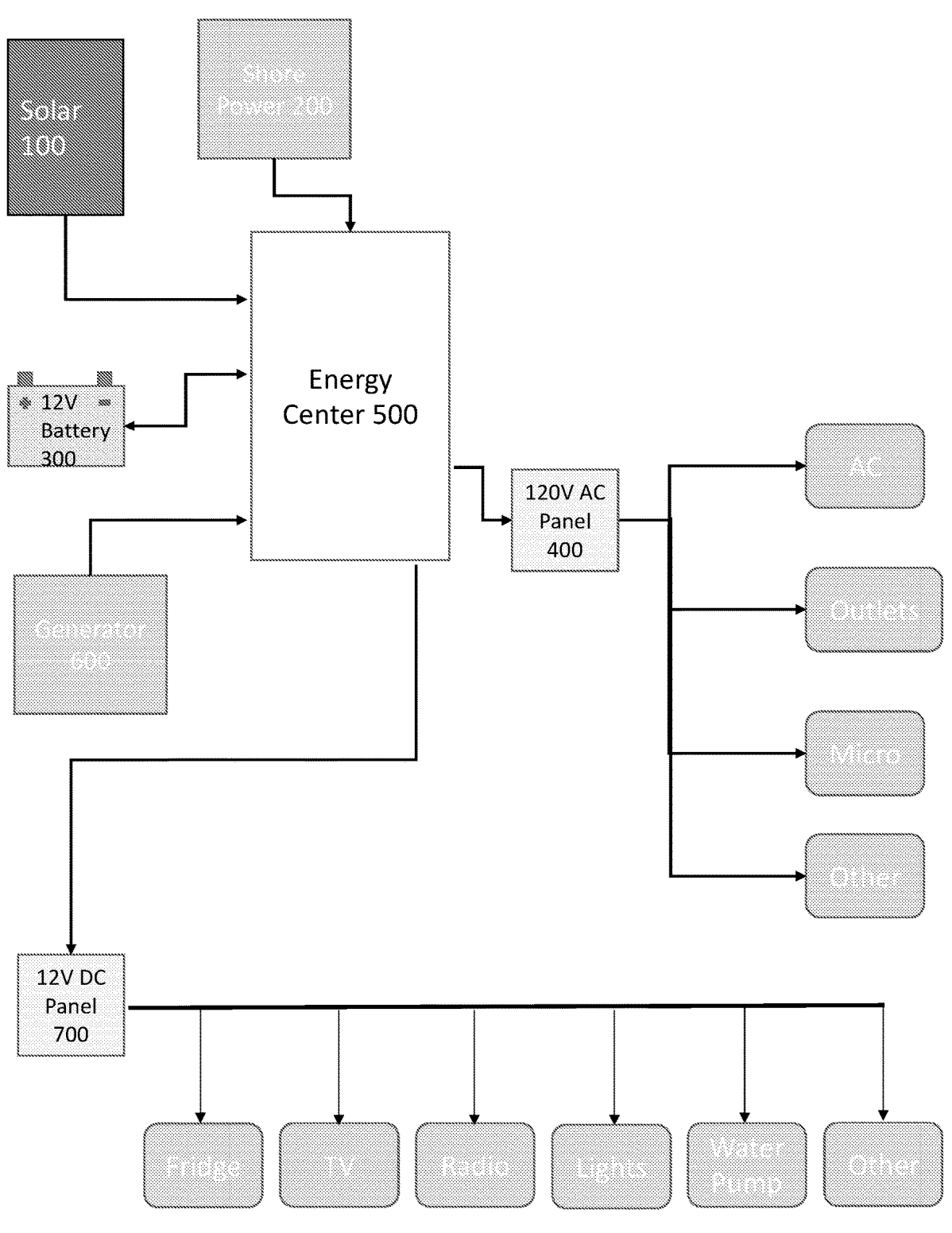
FIG. 1 is a simplified electrical schematic of a first embodiment of an RV power system using a 12V battery bank and an exemplary embodiment of the energy center.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a simplified electrical schematic of a first embodiment of an RV power system using a 12V battery bank 300 and an exemplary embodiment of the energy center 500. In this embodiment, multiple power sources are providing power input to the energy center 500 including a generator 600, shore power 200 (traditional electrical hookup at a campground, festival, fairground, etc.), a solar panel array 100 (having any number of panels in any wiring arrangement), and a battery bank 300 (shown here as 12V battery bank but as shown below a 48V can also be used as well as 24V by those having ordinary skill in the art). The energy center 500 can then take multiple electronic actions depending on what is happening with these power inputs. For example, if shore power 200 is present and the battery bank 300 is low, the shore power 200 may be used to charge the battery bank 300. If solar power 100 is present and the battery bank 300 is low, the solar power 100 may be used to charge the battery bank 300. Similarly, if generator power 600 is present, the generator 600 may be used to charge the battery bank 300.

In this embodiment, there are two electrical panels that receive the power output from the energy center 500. The first panel is a 120V AC panel 400 which typically holds a set of breakers and distributes power to several appliances including but not limited to air-conditioning (AC) unit(s), outlets, microwave, and other (washing machine, dryer, heater, etc.). The second panel is a 12V DC panel 700 which typically holds a set of fuses and distributes power to a variety of appliances including but not limited to a refrigerator, television, radio/stereo, lights, water pump(s), and other (awning motors, slide out/pop out motors.

Figure 2:
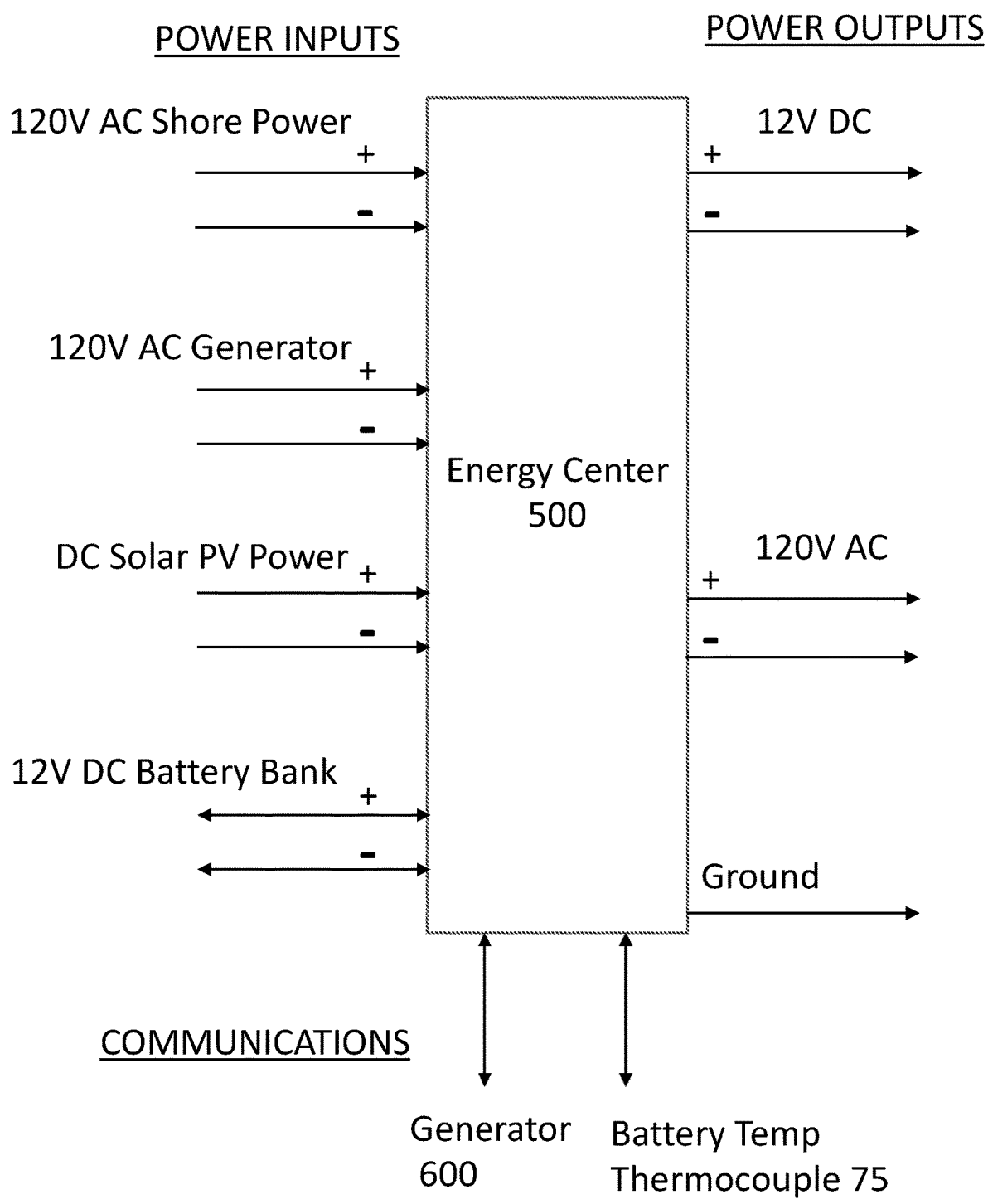
FIG. 2 is an electrical schematic of the inputs and outputs of an embodiment of the energy center.

FIG. 2 is an electrical schematic of the inputs and outputs of an embodiment of the energy center 500. The power inputs on this embodiment include a 120V AC shore power, 120V AC generator, DC solar photovoltaic power, and 12V DC battery bank. The electrical power outputs include a 12V DC output as well as a 120V AC output (as well as a ground). This embodiment of the power center 500 also preferable includes some electrical communication connections as well, including a communication line with the generator 600 as well as one for a thermocouple 75 positioned to measure the temperature of the battery bank 300.

FIG. 3 is a simplified electrical block diagram of the internal components of an embodiment of the energy center 500. A transfer switch 10 is used to detect the performance of the incoming power sources to determine which are currently available and properly switching between incoming power sources when there is adequate indication that they are available for use. The transfer switch 10 can also provide over voltage/under voltage protection by turning off power sources that are exhibiting electrical parameters that fall outside the acceptable range for incoming power into the power center 500.

A bi-directional inverter 20 is used to convert AC electrical energy to DC electrical energy, as well as DC electrical energy to AC electrical energy. A solar charge controller 30 is used to handle the varying amounts of power produced by the photovoltaic solar panel array 100. A DC:DC converter 40 is used to step up or down DC power to the appropriate amount for the panel and/or appliances. A variety of communication modules may be used with the exemplary embodiments herein, these would include a Bluetooth module 20, wi-fi module 25, and a satellite module 30.

A battery management assembly/smart shunt/battery shunt 50 is used to monitor the status of the battery bank (current load, % of total battery life remaining, amount of power being sent to battery bank, etc.). One or more fans 60 are preferably positioned to draw ambient air through the housing of the energy center 500 in order to cool components. The fan bank 60 is preferably energized when high ambient temperatures are detected by the interior temp thermocouple 70 and this information is processed by the energy center control module 80. An additional thermocouple 75 is preferably positioned to measure the temperature of the battery bank, and this thermocouple 75 is also preferably in electrical communication with the control module 80 so that if a high temperature condition is measured at the battery bank 300/350 so that any battery charging or dis-charging could be slowed or stopped.

The control module 80 may include a variety of different components such as a microprocessor, RAM, CPU, hard drive, or flash drive storage. The control module 80 preferably contains a processor that performs the logic described herein, giving the energy center 500 all of the functionality that is described in words herein, this would be in software code stored in a storage device on the control module 80.

Figure 4:
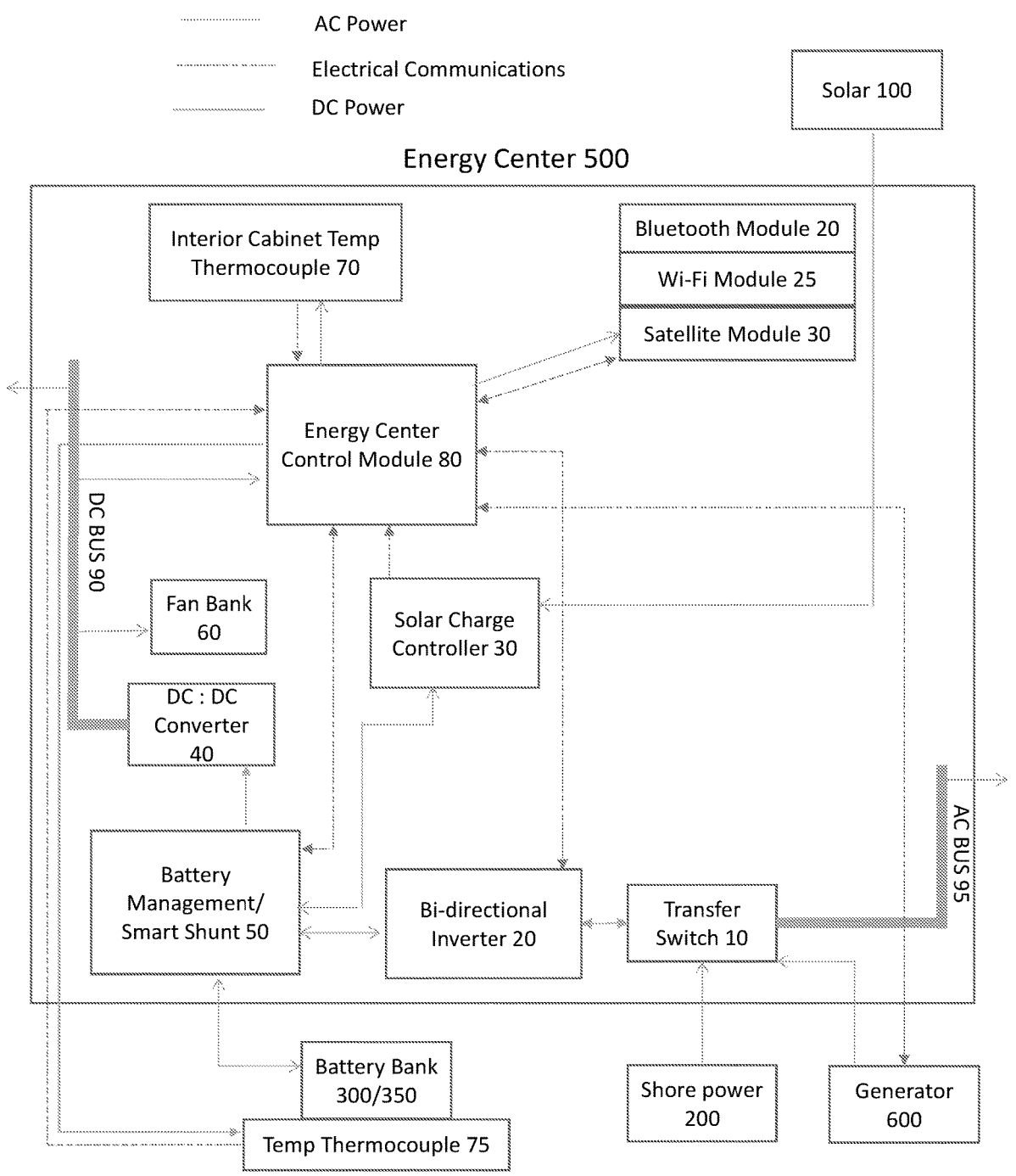
FIG. 4 is an electrical schematic of the AC power distribution, DC power distribution, and electrical communications of the internal components of an embodiment of the energy center.

FIG. 4 is an electrical schematic of the AC power distribution, DC power distribution, and electrical communications of the internal components of an embodiment of the energy center 500. Incoming DC power from the solar array 100 is first sent to the solar charge controller 30 for smoothing, conditioning, and/or cleaning of the incoming PV power before going to the battery management/smart shunt 50 and eventually the battery bank 300/350. A temperature thermocouple 75 is positioned to measure the temperature of the battery bank 300/350 and this thermocouple 75 is in electrical communication with the control module 80 for both DC power as well as electrical communications. The solar charge controller 30 is also preferably in electrical communication with the control module 80 to provide various data regarding the performance of the solar array 100.

The shore power 200 as well as the generator 600 each provide incoming AC power directly to the transfer switch 10. An AC power bus 95 is electrically connected to and accepts AC power from the transfer switch 10. The AC bus 95 can also provide the output AC power being sent from the energy center 500 (sometimes to an AC panel for distribution). The transfer switch 10 also shares AC power with the bi-directional inverter 20 which can convert the AC power from the transfer switch 10 to DC power. This DC power can then be sent to the battery management/smart shunt 50 before going to either the battery bank 300/350 or DC:DC converter 40.

The DC:DC converter 40 may convert the incoming DC power to the appropriate voltage for the DC bus 90. In some embodiments, the DC bus 90 would be 12V DC and would be used to send 12V DC power to the fan bank 60 as well as the control module 80. The DC bus 90 can also provide the output DC power being sent out from the energy center 500 (sometimes to an DC panel for distribution). The battery management/smart shunt 50 accepts incoming DC power from the battery bank 300/350 and then sends this to either the DC:DC converter 40 or the bi-directional inverter 20, while some power may also be passed to the solar charge controller 30 (if necessary). The battery management/smart shunt 50 is also in electrical communication with the control module 80 to provide information on battery status and performance to the user through the various communication modules 20, 25, and 30.

The fan bank 60 may draw power from the DC bus 90 and is preferably energized when data from the thermocouple 70 inside the energy center 500 cabinet indicates high temperatures. The data from the thermocouple 70 is transmitted to the control module 80 for processing and analysis, and power for the thermocouple 70 can also come from the control module 80.

Figure 5:
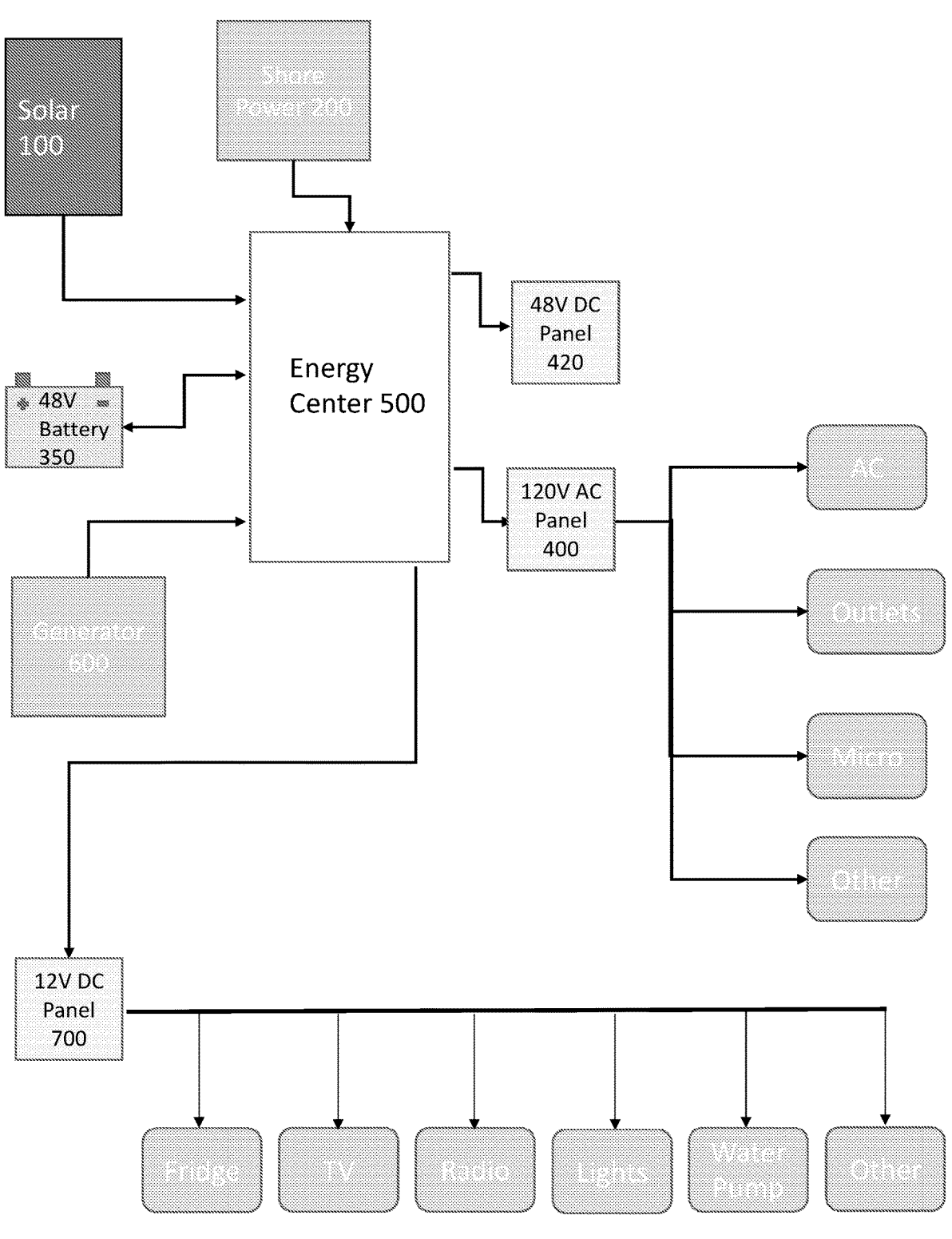
FIG. 5 is a simplified electrical schematic of a second embodiment of an RV power system using a 48V battery bank and an exemplary embodiment of the energy center with an optional 48V panel for later use and/or appliance upgrades.

FIG. 5 is a simplified electrical schematic of a second embodiment of an RV power system using a 48V battery bank 350 and an exemplary embodiment of the energy center 500 with an optional 48V panel 420 for later use and/or appliance upgrades.

Figure 6:
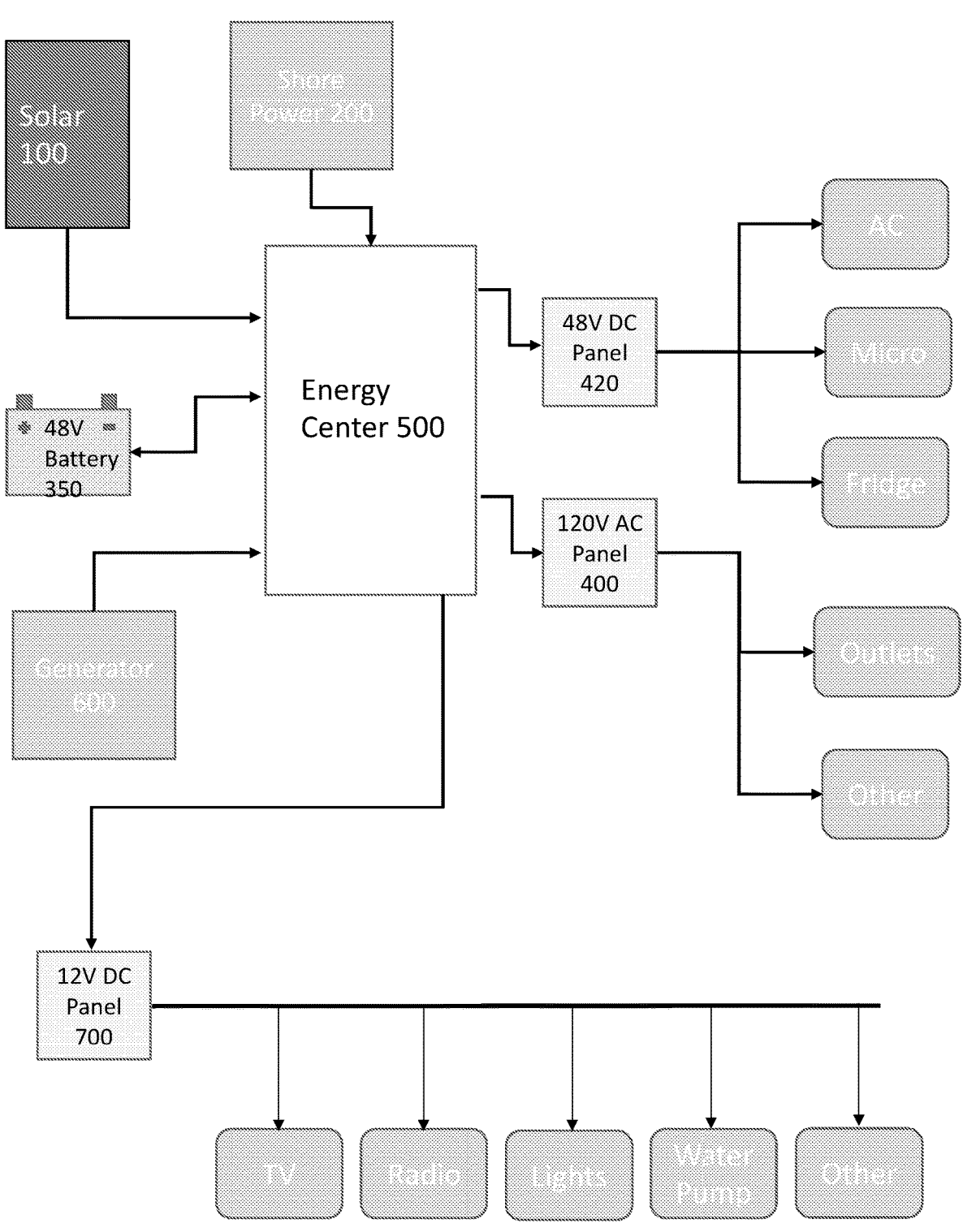
FIG. 6 is a simplified electrical schematic of a third embodiment of an RV power system using a 48V battery bank and an exemplary embodiment of the energy center with the refrigerator, AC, and microwave on a 48V panel.

FIG. 6 is a simplified electrical schematic of a third embodiment of an RV power system using a 48V battery bank 350 and an exemplary embodiment of the energy center 500 with the refrigerator, AC, and microwave on a 48V DC panel 420.

Figure 7:
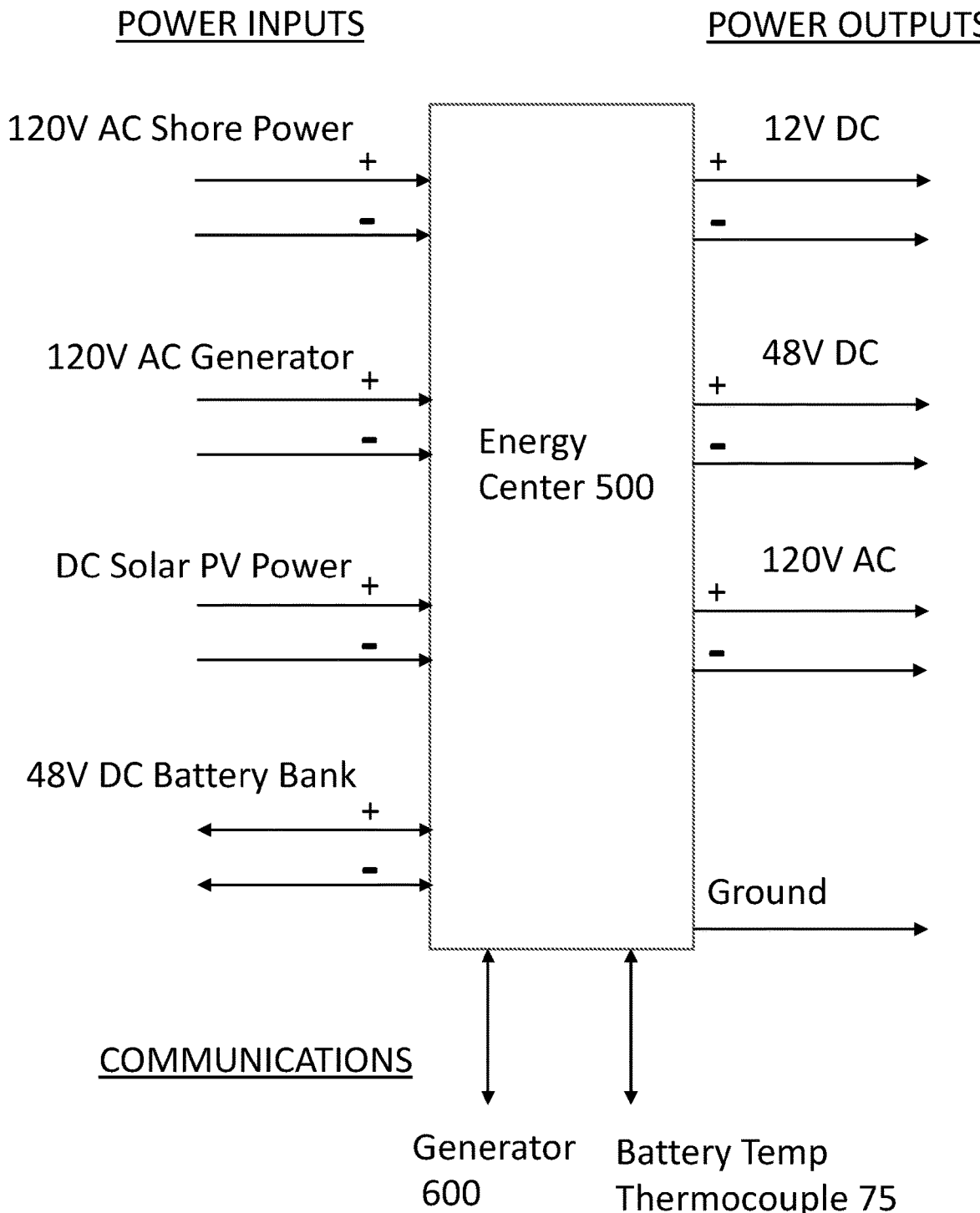
FIG. 7 is an electrical schematic of the inputs and outputs of another embodiment of the energy center.

FIG. 7 is an electrical schematic of the inputs and outputs of another embodiment of the energy center 500, one that would provide the additional 48V output as described with FIGS. 6 and 7. Most of the connections are the same as shown above in FIG. 2, however this embodiment uses a 48V battery bank 350 and also provides the additional 48V DC output.

Figure 8:
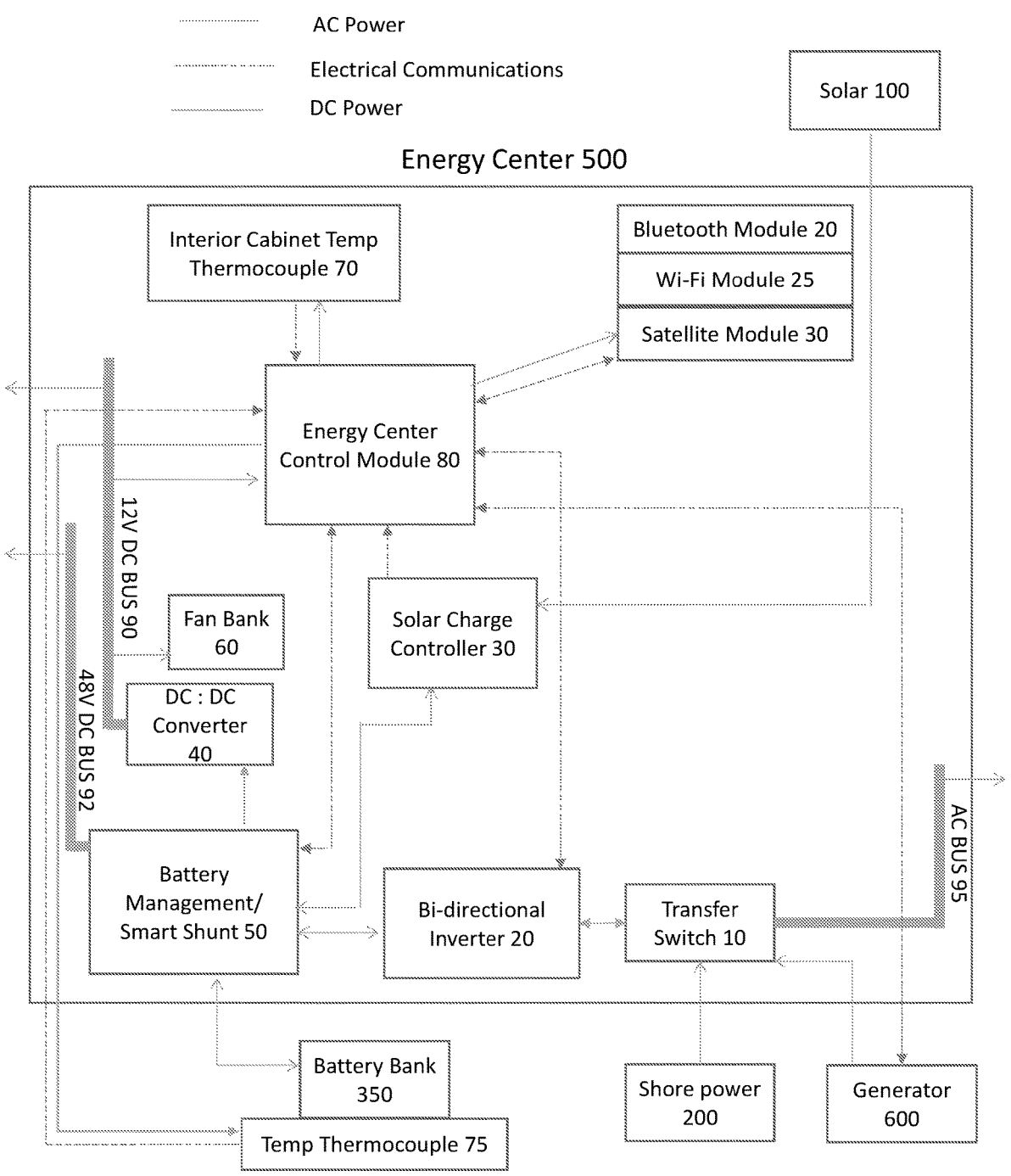
FIG. 8 is an electrical schematic of the AC power distribution, DC power distribution, and electrical communications of the internal components of another embodiment of the energy center.

FIG. 8 is an electrical schematic of the AC power distribution, DC power distribution, and electrical communications of the internal components of another embodiment of the energy center 500. Most of the connections are the same as shown above in FIG. 4, however this embodiment uses a 48V battery bank 350 which transmits 48V DC power to the battery management/smart shunt 50 which then transfers this power to an additional DC bus 92 which is also set to 48V DC. This additional bus 92 can also provide the 48V DC output power exiting the enclosure of the energy center 500. As shown above in FIG. 5, this output 48V DC power can be sent to a 48V DC panel 420 for future use. Alternatively, as shown in FIG. 6, the 48V DC panel 420 can be used to distribute power to various 48V appliances, including but not limited to air-conditioning unit, refrigerator, and microwave.

The particular combination of components and features shown herein has surprisingly shown a number of advantages in less manufacturing time, less total weight, lower assembly complexity, lower unit cost, increased safety, and increased features. With the communication modules 20, 25, and 30 any data read by the control module 80 can be transmitted to the user such as: battery % charge, incoming shore power/voltage/amps, incoming generator power/voltage/amps, battery temperature, internal cabinet temperature, incoming solar power power/voltage/amps, current power usage rate (watts/hour).

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. A recreational vehicle power system comprising:
an AC power bus;
a transfer switch in AC power connection with the AC power bus which directly accepts shore power input and generator power input;
a DC power bus;
a DC-DC converter in DC power connection with the DC power bus;

a solar charge controller which receives photovoltaic power from a solar panel;
a bi-directional inverter in AC power connection with the transfer switch;
a battery management assembly in DC power connection with the solar charge controller, bi-directional inverter, DC-DC converter, and a battery,
wherein each of the solar charge controller, and bi-directional inverter simultaneously provides associated power inputs to the battery management assembly;
a control module in DC power connection with the DC power bus and in electrical communication with the battery management assembly, solar charge controller, and bi-directional inverter,
wherein the control module is configured to monitor the battery management assembly and the power inputs and further configured to take multiple electronic actions based on the power inputs,
wherein a first electronic action includes actively controlling the activation of the solar charge controller, bi-directional inverter, and balancing how much power is provided to the battery;
a temperature thermocouple positioned to measure a temperature of the battery and placed in electrical communication with the control module;
wherein a second electronic action includes the control module stopping any battery charging by the solar charge controller, generator power input, and shore power input when a high temperature condition is measured at the battery; and
wherein a third electronic action includes the control module stopping any battery dis-charging when a high temperature condition is measured at the battery.

2. The power system of claim 1 further comprising:
a fan in DC power communication with the DC power bus.

3. The power system of claim 1 further comprising:
a Bluetooth module placed in electrical communication with the control module.

4. The power system of claim 1 wherein:
the transfer switch sends either generator power or shore power to the bi-directional inverter.

5. The power system of claim 1 wherein:
the bi-directional inverter accepts incoming AC power from the transfer switch and send outgoing DC power to the battery.

6. The power system of claim 1 wherein: the control module determines when the battery % charge is below a lower limit threshold and sends a corresponding electrical start signal to a generator when determined.

7. The power system of claim 6 wherein:
the control module further determines when the battery % charge is above an upper limit threshold and sends a corresponding electrical stop signal to the generator when determined.

8. A recreational vehicle power system comprising:
an AC power bus;
a transfer switch in AC power connection with the AC power bus and which directly accepts shore power input and generator power input;
a DC power bus;
a DC-DC converter in DC power connection with the DC power bus;
a solar charge controller which receives photovoltaic power from a solar panel;
a bi-directional inverter in AC power connection with the transfer switch;

a battery management assembly in DC power connection with the solar charge controller, bi-directional inverter, DC-DC converter, and a battery, wherein each of the solar charge controller, and bi-directional inverter simultaneously provides associated power inputs to the battery management assembly; and a control module in DC power connection with the DC power bus and in electrical communication with the battery management assembly, solar charge controller, and bi-directional inverter, wherein the control module is configured to monitor the battery wherein the control management assembly and the power inputs and further configured to take multiple electronic actions based on the power inputs, wherein a first electronic action includes actively controlling the activation of the solar charge controller, bi-directional inverter, and balancing how much power is provided to the battery;

wherein a second electronic action includes the control module determining when the battery % charge is below a lower limit threshold and sends a corresponding electrical start signal to the generator power input when determined;

wherein a third electronic action includes the control module selectively slowing and stopping the photovoltaic power, shore power, and generator power from charging the battery; and wherein a fourth electronic action includes the control module stopping the discharging of the battery.

9. The power system of claim 8 further comprising:

a thermocouple positioned to measure a temperature of the battery.

10. The power system of claim 9 further comprising:

electrical communications between the control module and the thermocouple.

11. The power system of claim 8 further comprising:

a communication module in electrical communication with the control module which communicates data from the battery management system to a user.

12. The power system of claim 8 wherein: the control module further determines when the battery % charge is below a lower limit threshold and sends a corresponding electrical start signal to a generator when determined.

13. A recreational vehicle power system comprising:

an AC power bus;

a transfer switch in AC power connection with the AC power bus which directly accepts shore power input and generator power input;

a 12 volt DC power bus providing a 12 volt DC output;

a DC-DC converter in DC power connection with the 12 volt DC power bus;

a solar charge controller which receives photovoltaic power from a solar panel;

a bi-directional inverter in AC power connection with the transfer switch;

a battery management assembly in DC power connection with the solar charge controller, bi-directional inverter, DC-DC converter, and a battery, wherein each of the solar charge controller, and bi-directional inverter simultaneously provides associated power inputs to the battery management assembly;

a control module in DC power connection with the DC power bus and in electrical communication with the battery management assembly, solar charge controller, a generator, and bi-directional inverter, wherein the control module is configured to monitor the battery management assembly and the power inputs and further configured to take one or more electronic actions based on the power inputs, wherein a first electronic action includes actively controlling the activation of the solar charge controller, bi-directional inverter, and balancing how much power is provided to the battery;

a temperature thermocouple positioned to measure the temperature of the battery and placed in electrical communication with the control module; and a communication module in electrical communication with the control module which communicates incoming amps from the generator, incoming power from the solar panel, the temperature of the battery, and the current power usage of the recreational vehicle power system to a user.

14. The power system of claim 13 wherein:

the 12 volt DC output is sent to a 12 volt DC panel.

\* \* \* \* \*